United States Patent
Yang et al.

(10) Patent No.: US 12,501,160 B2
(45) Date of Patent: Dec. 16, 2025

(54) CAMERA APPARATUS AND ELECTRONIC DEVICE

(71) Applicant: VIVO MOBILE COMMUNICATION CO., LTD., Dongguan (CN)

(72) Inventors: Zhuojian Yang, Dongguan (CN); Ze Yang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 209 days.

(21) Appl. No.: 18/486,240

(22) Filed: Oct. 13, 2023

(65) Prior Publication Data
US 2024/0040257 A1 Feb. 1, 2024

Related U.S. Application Data

(63) Continuation of application No. PCT/CN2022/086139, filed on Apr. 11, 2022.

(30) Foreign Application Priority Data

Apr. 15, 2021 (CN) .......................... 202110405573.2

(51) Int. Cl.
*H04N 23/68* (2023.01)
*H04N 23/51* (2023.01)
(Continued)

(52) U.S. Cl.
CPC .......... *H04N 23/687* (2023.01); *H04N 23/51* (2023.01); *H04N 23/52* (2023.01); *H04N 23/54* (2023.01); *H04N 23/55* (2023.01)

(58) Field of Classification Search
CPC ........ G02B 27/646; G02B 7/023; G02B 7/08; G03B 2205/0015; G03B 2205/0038;
(Continued)

(56) References Cited

U.S. PATENT DOCUMENTS

| 5,668,670 A | 9/1997 | Nakayama et al. |
| 9,380,212 B2 | 6/2016 | Ahn |

(Continued)

FOREIGN PATENT DOCUMENTS

| CN | 105573014 A | 5/2016 |
| CN | 110049235 A | 7/2019 |

(Continued)

OTHER PUBLICATIONS

Extended European Search Report related to Application No. 22787488. 0; reported on Jul. 22, 2024.
(Continued)

*Primary Examiner* — Amy R Hsu
(74) *Attorney, Agent, or Firm* — von Briesen & Roper, s.c.

(57) ABSTRACT

A camera apparatus and an electronic device are disposed. The disclosed camera apparatus includes a supporting circuit board, an outer frame base, an inner frame base, a photosensitive chip, a lens holder, a lens, and a first driving mechanism, where the outer frame base is disposed on the supporting circuit board, the lens holder is disposed on the outer frame base, the lens is disposed on the lens holder, the supporting circuit board is electrically connected to the photosensitive chip via the outer frame base and the inner frame base sequentially; the inner frame base is movably disposed on the outer frame base, the photosensitive chip is disposed on the inner frame base, the photosensitive chip is arranged opposite to the lens, the first driving mechanism is configured to drive the inner frame base to move.

19 Claims, 9 Drawing Sheets

(51) Int. Cl.
  *H04N 23/52* (2023.01)
  *H04N 23/54* (2023.01)
  *H04N 23/55* (2023.01)
(58) Field of Classification Search
  CPC .. G03B 2205/0069; G03B 30/00; G03B 5/00;
         H04N 23/51; H04N 23/52; H04N 23/54;
         H04N 23/55; H04N 23/57; H04N 23/68;
                                   H04N 23/687
  See application file for complete search history.

(56) References Cited

U.S. PATENT DOCUMENTS

| | | | |
|---|---|---|---|
| 2009/0244302 A1 | 10/2009 | Tsai | |
| 2010/0165131 A1* | 7/2010 | Makimoto | H04N 23/68 |
| | | | 359/557 |
| 2011/0026915 A1 | 2/2011 | Baik et al. | |
| 2013/0016427 A1 | 1/2013 | Sugawara | |
| 2014/0226224 A1 | 8/2014 | Cho et al. | |
| 2018/0173080 A1 | 6/2018 | Enta | |
| 2018/0329173 A1* | 11/2018 | Hu | H04N 23/55 |
| 2019/0141248 A1 | 5/2019 | Hubert et al. | |
| 2019/0373174 A1 | 12/2019 | Ba-Tis et al. | |
| 2019/0391300 A1 | 12/2019 | Ha | |
| 2020/0099317 A1 | 3/2020 | Wang et al. | |
| 2020/0326499 A1 | 10/2020 | Wang et al. | |
| 2021/0096318 A1 | 4/2021 | Dobashi | |
| 2021/0144316 A1* | 5/2021 | Hsu | H04N 25/79 |
| 2021/0258491 A1 | 8/2021 | Park | |
| 2021/0297615 A1 | 9/2021 | Ogata | |
| 2022/0011537 A1 | 1/2022 | Chang et al. | |
| 2022/0191359 A1 | 6/2022 | Oh | |
| 2023/0036225 A1 | 2/2023 | Pang | |
| 2024/0040257 A1* | 2/2024 | Yang | H04N 23/55 |

FOREIGN PATENT DOCUMENTS

| | | |
|---|---|---|
| CN | 209417492 U | 9/2019 |
| CN | 111510598 A | 8/2020 |
| CN | 111654612 A | 9/2020 |
| CN | 111726508 A | 9/2020 |
| CN | 212486606 U | 2/2021 |
| CN | 212785548 | 3/2021 |
| CN | 212935999 | 4/2021 |
| CN | 113114899 A | 7/2021 |
| JP | H06313831 A | 11/1994 |
| JP | 2004048266 A | 2/2004 |
| JP | 2005062633 A | 3/2005 |
| JP | 2008077072 A | 4/2008 |
| JP | 2008203433 A | 9/2008 |
| JP | 2008225158 A | 9/2008 |
| JP | 2012093788 A | 5/2012 |
| JP | 2013024938 A | 2/2013 |
| JP | 2014153718 A | 8/2014 |
| JP | 2018056810 A | 4/2018 |
| JP | 2019148698 A | 9/2019 |
| JP | 2020506427 A | 2/2020 |
| JP | 2020036216 A | 3/2020 |
| JP | 2020170170 A | 10/2020 |
| KR | 20130055136 A | 5/2013 |
| KR | 101308619 B1 | 9/2013 |
| KR | 20150089648 A | 8/2015 |
| TW | I694299 B | 5/2020 |
| WO | 2020004975 A1 | 1/2020 |
| WO | 2020197150 A1 | 10/2020 |

OTHER PUBLICATIONS

Extended European Search Report related to Application No. PCT/CN2022/086139; reported on Jul. 22, 2024.
Japanese Office Action related to Application No. 2023-562657; reported on Nov. 27, 2024.
International Search Report & Written Opinion related to Application No. PCT/CN2022/086139; reported on Jun. 21, 2022.
Second Japanese Office Action related to Japanese Application No. 2023-562657, reported on May 7, 2025.

* cited by examiner

CAMERA APPARATUS AND ELECTRONIC DEVICE

CROSS-REFERENCE TO RELATED APPLICATIONS

This application is continuation application of PCT International Application No. PCT/CN2022/086139 filed on Apr. 11, 2022, which claims priority to Chinese Patent Application No. 202110405573.2, filed in China on Apr. 15, 2021, the disclosures of which are incorporated herein by reference in their entireties.

TECHNICAL FIELD

This application pertains to the field of communication device technologies, and specifically, relates to a camera apparatus and an electronic device.

BACKGROUND

As user demands increase, electronic devices are continually optimized for better performance. Particularly, camera apparatuses equipped in electronic devices have been rapidly developed. Camera apparatuses disclosed in related art employ stabilization techniques to achieve image stabilization during shooting, ultimately improving the quality of captured images. However, driving the lens to move to achieve stabilization poses a problem of significant power consumption as the lens becomes heavier. Additionally, the photosensitive chip is connected to electricity through a flexible circuit board, and therefore movement of the photosensitive chip under driving is impeded by the flexible circuit board, thereby affecting the stabilization effect.

SUMMARY

An objective of embodiments of this application is to provide a camera apparatus and an electronic device.

This application is implemented as follows.

According to a first aspect, an embodiment of this application provides a camera apparatus. The disclosed camera apparatus includes a supporting circuit board, an outer frame base, an inner frame base, a photosensitive chip, a lens holder, a lens, and a first driving mechanism, where the outer frame base is disposed on the supporting circuit board, the lens holder is disposed on the outer frame base, the lens is disposed on the lens holder, and the supporting circuit board is electrically connected to the photosensitive chip via the outer frame base and the inner frame base sequentially; and the inner frame base is movably disposed on the outer frame base, the photosensitive chip is disposed on the inner frame base, the photosensitive chip is arranged opposite to the lens, the first driving mechanism is configured to drive the inner frame base to move, and the photosensitive chip is capable of performing stabilization movements along with the inner frame base in a plane perpendicular to an optical axis of the lens.

In a second aspect, an embodiment of this application provides an electronic device. The disclosed electronic device includes any of the camera apparatuses described above.

The technical approach used in the embodiments of this application can achieve the following beneficial effects.

The camera apparatus disclosed in the embodiments of this application is improved based on structure of the camera apparatus in the related art. With the photosensitive chip disposed on the inner frame base, the inner frame base disposed on the outer frame base, the outer frame base disposed on the supporting circuit board, the lens holder disposed on the outer frame base, the lens disposed on the lens holder, the inner frame base movably disposed on the outer frame base, and the photosensitive chip electrically connected to the supporting circuit board via the inner frame base and outer frame base, the lens, lens holder, photosensitive chip, inner frame base, and outer frame base are disposed sequentially on the supporting circuit board, the inner frame base can drive, under driving of the first driving mechanism, the photosensitive chip to move, so as to realize the stabilization movements of the camera apparatus.

Reference signs are described as follows:

100. supporting circuit board;
200. outer frame base;
300. inner frame base;
400. photosensitive chip, 410. solder ball;
500. lens holder;
600. lens;
700. first driving mechanism, 710. first driving sub-mechanism, 711. first electromagnetic coil, 712. first permanent magnet, 720. second driving sub-mechanism, 721. second electromagnetic coil, 722. second permanent magnet;
800. adjustable lens module;
900. filter;
1000. protective housing, 1000a. avoidance hole, 1000b. avoidance channel,
1000c. electrical connection pins;
1100. first set of rolling elements;
1200. second set of rolling elements;
1300. lifting mechanism, 1310. support portion, 1311. guide slot, 1320. second driving mechanism, 1321. third electromagnetic coil, 1322. third permanent magnet, 1330. third set of rolling elements;

A. conductive adhesive layer, B. gold wire, and C. connective adhesive layer.

DESCRIPTION OF EMBODIMENTS

The following clearly and completely describes the technical solutions in embodiments of this application with reference to the accompanying drawings in the embodiments of this application. Apparently, the described embodiments are only some rather than all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that data used in this way is used interchangeably in appropriate circumstances such that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

The camera apparatus and electronic device disposed in the embodiments of this application are hereinafter described in detail by using specific embodiments and application scenarios thereof with reference to the accompanying drawings.

Figure 1:
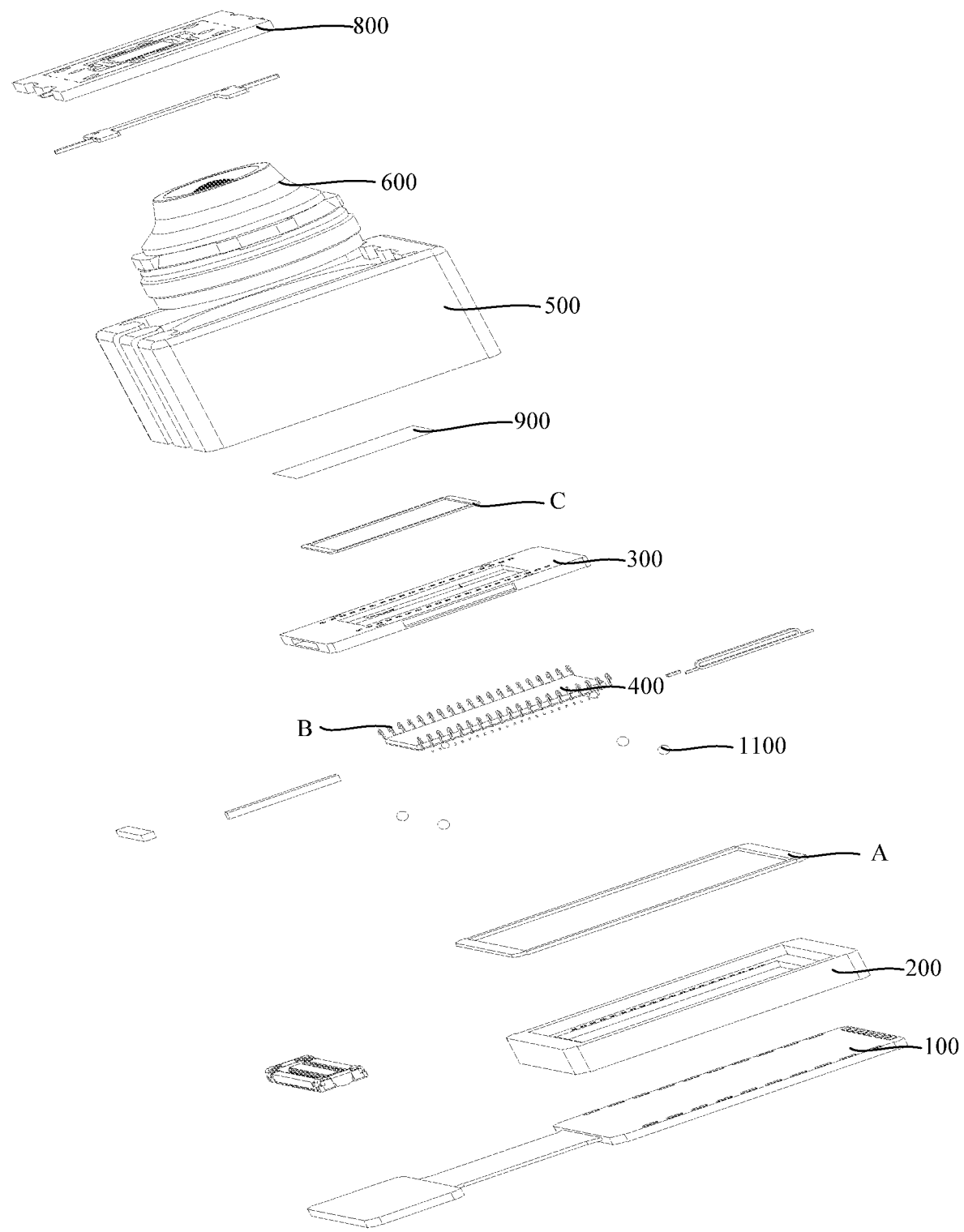
FIG. 1 is a schematic diagram of an exploded structure of a camera apparatus disclosed according to an embodiment of this application.
Figure 2:
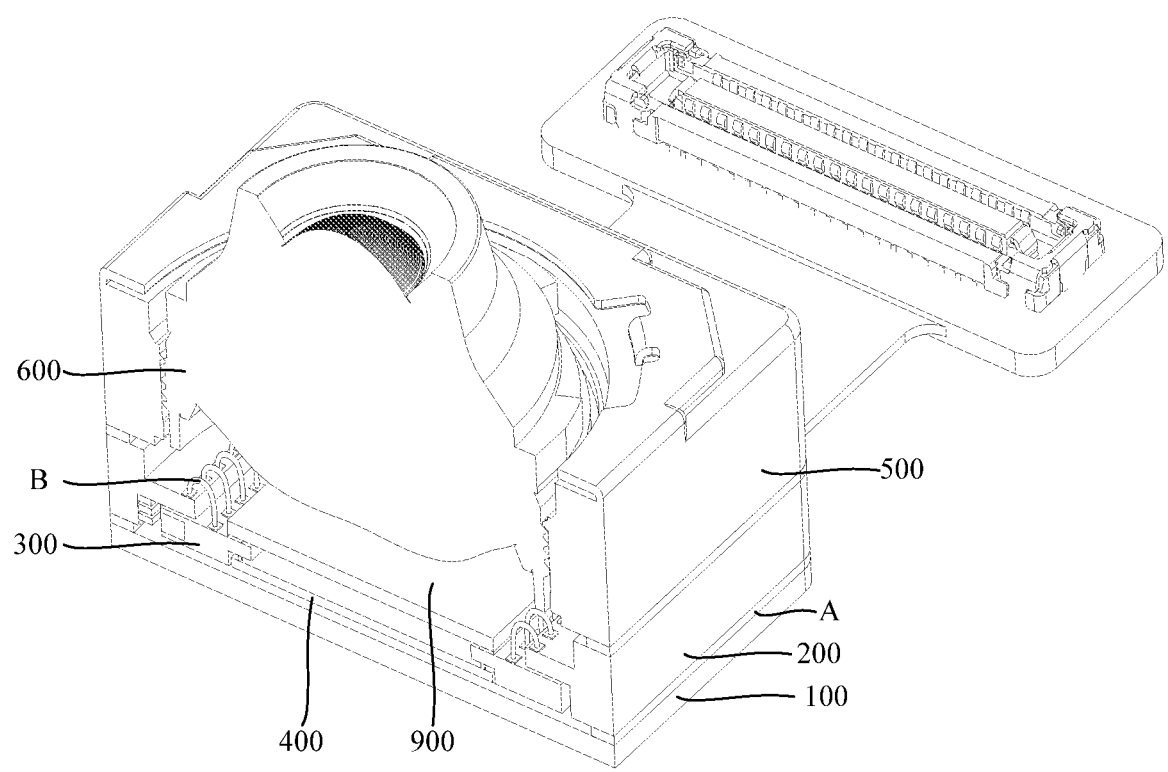
FIG. 2 is a cross-sectional view of a camera apparatus disclosed according to an embodiment of this application.
Figure 3:
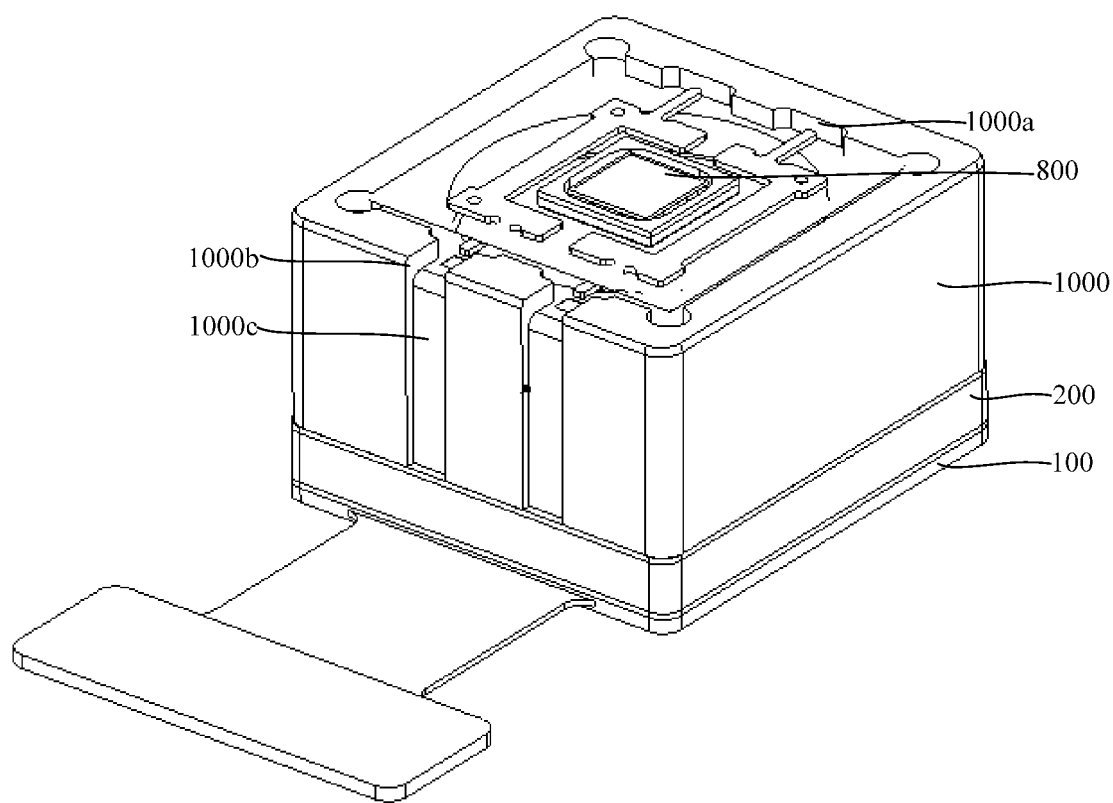
FIG. 3 is a schematic diagram of an overall structure of a camera apparatus disclosed according to an embodiment of this application.
Figure 4:
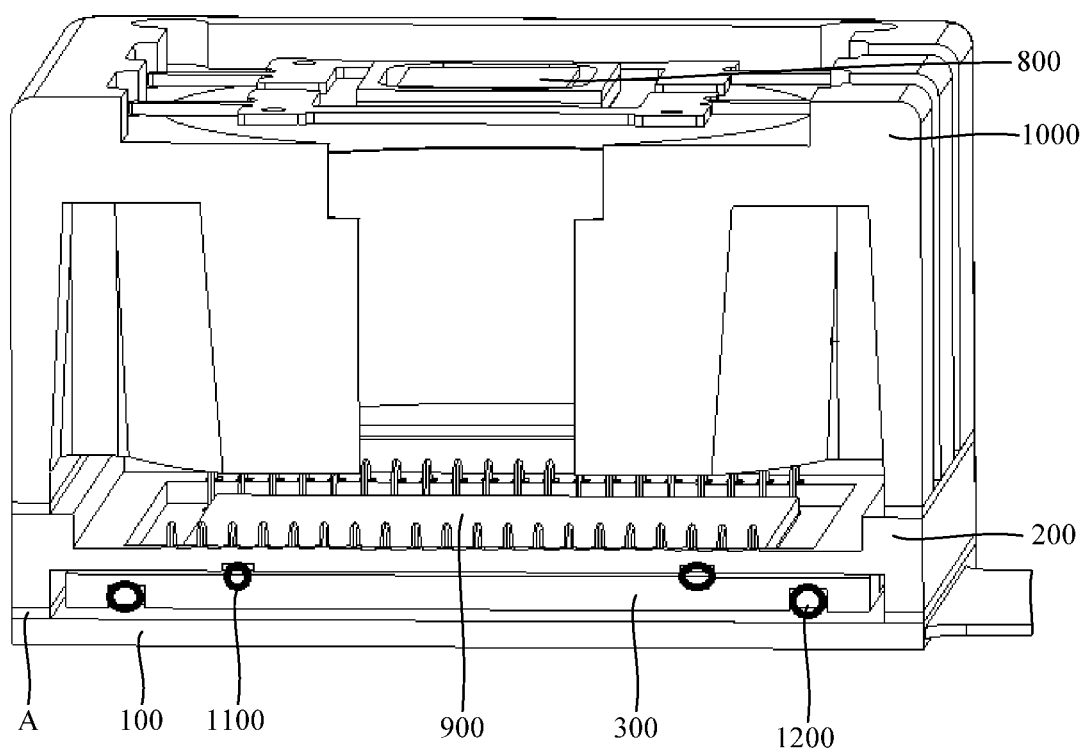
FIG. 4 is a schematic structural diagram of a camera apparatus disclosed according to an embodiment of this application.
Figure 5:
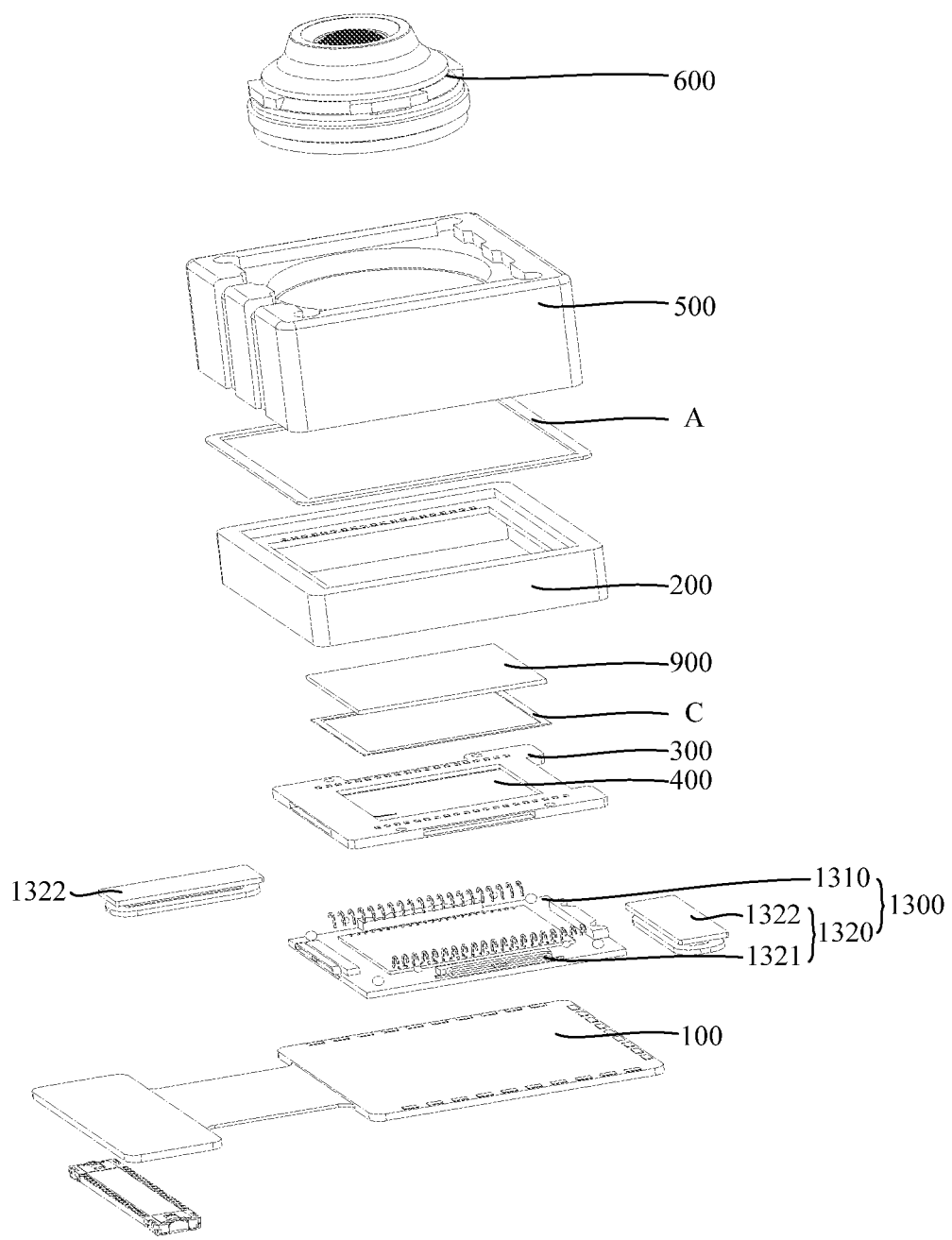
FIG. 5 is a schematic diagram of an exploded structure of a camera apparatus disclosed according to an embodiment of this application.
Figure 6:
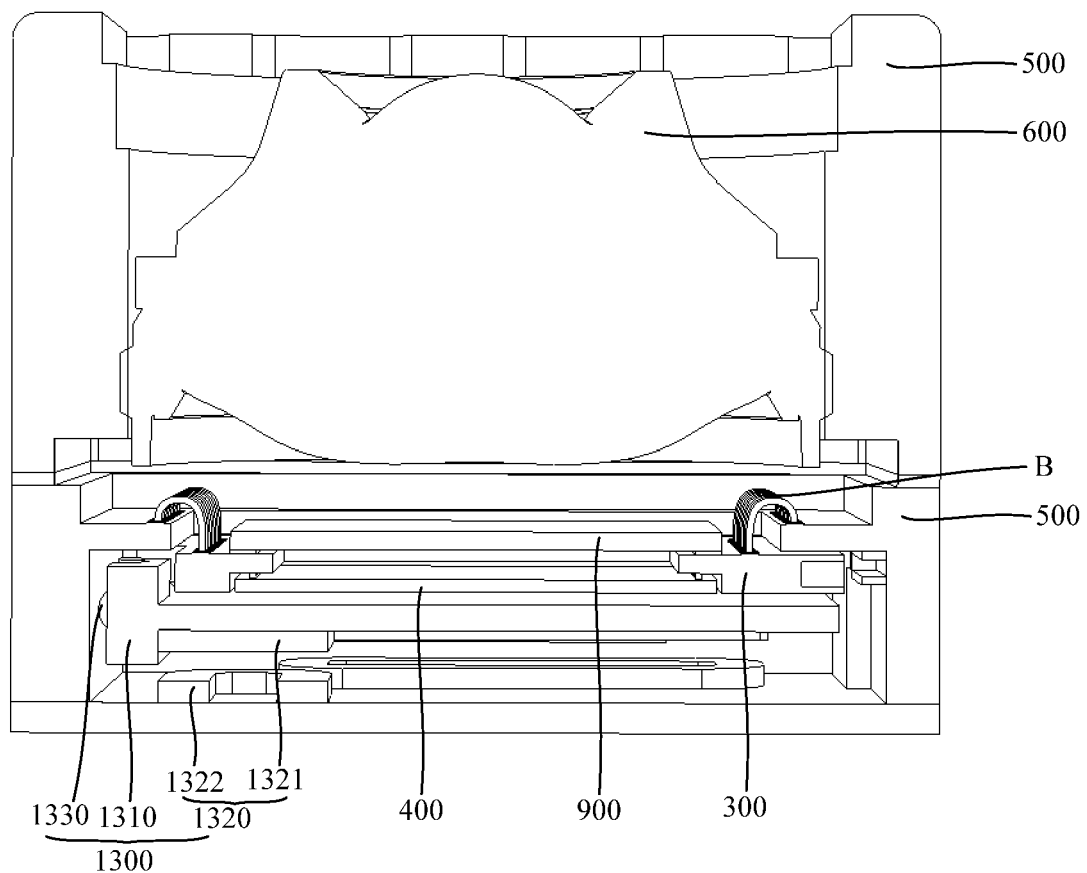
FIG. 6 is a schematic diagram of partial structure of a camera apparatus disclosed according to an embodiment of this application.
Figure 7:
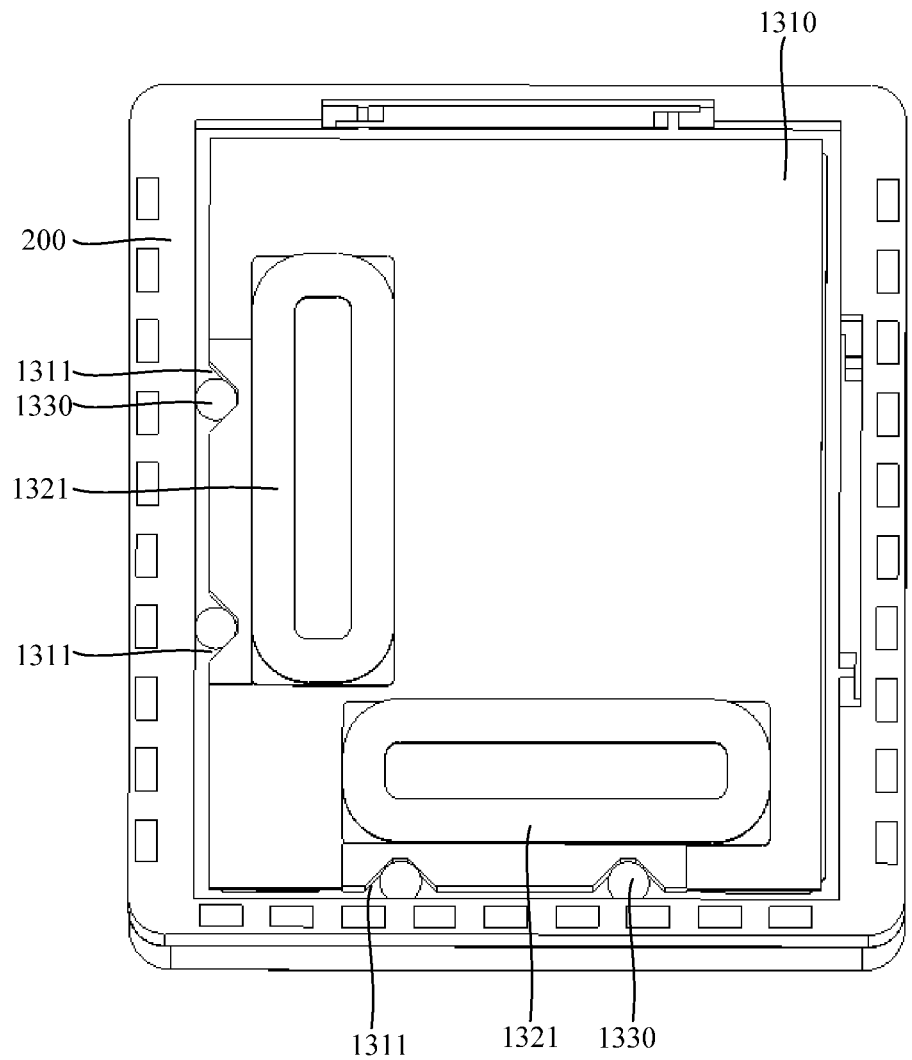
FIG. 7 is a schematic diagram of a planar structure of a first driving mechanism of a camera apparatus disclosed according to an embodiment of this application.
Figure 8:
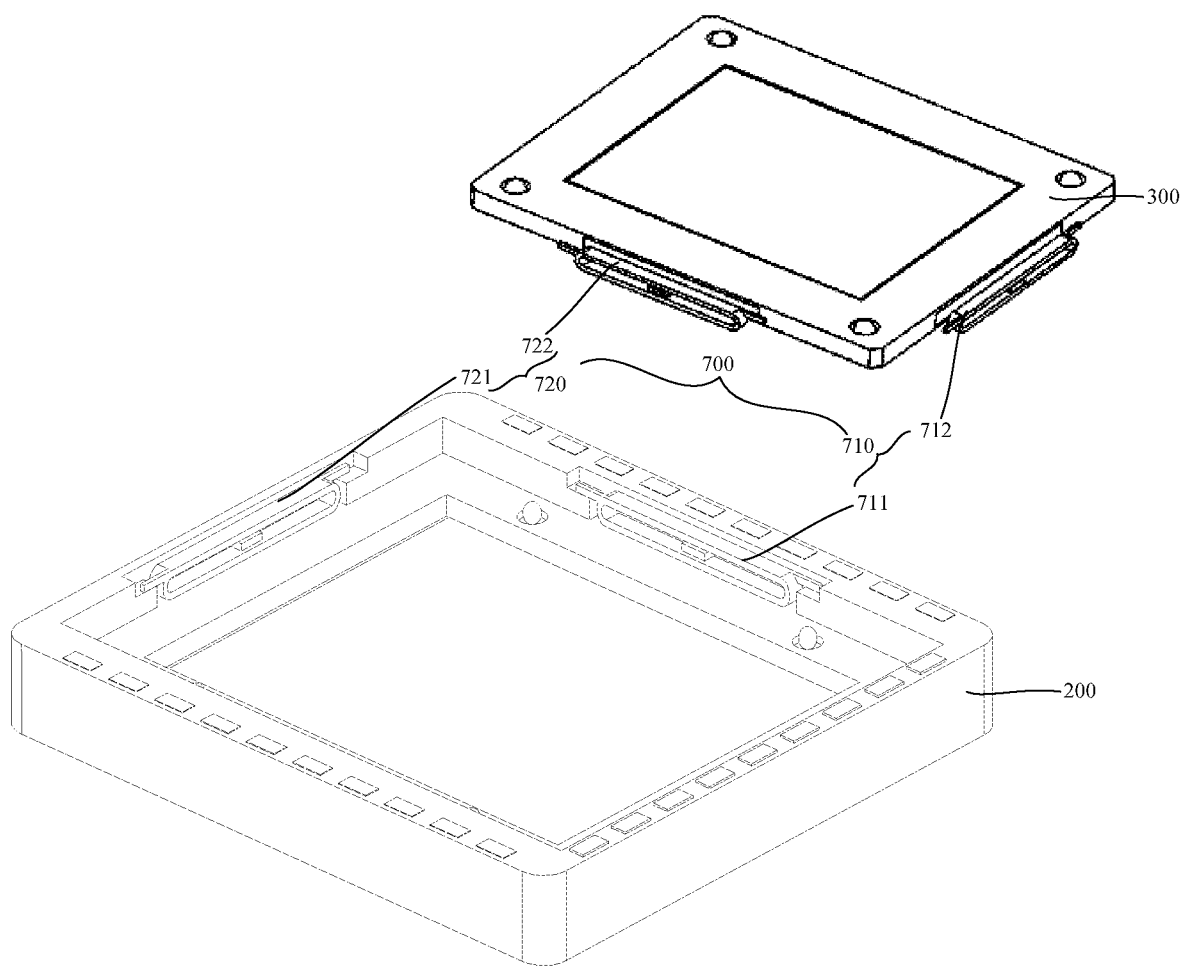
FIG. 8 is a schematic diagram of a three-dimensional structure of a first driving mechanism of a camera apparatus disclosed according to an embodiment of this application.
Figure 9:
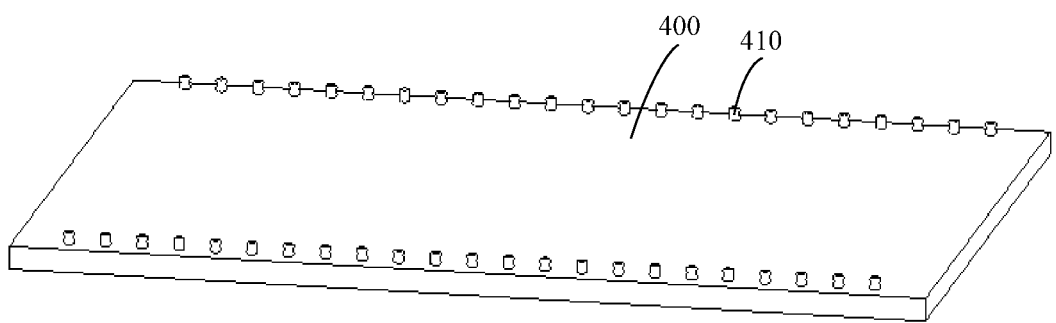
FIG. 9 is a schematic structural diagram of a photosensitive chip of a camera apparatus disclosed according to an embodiment of this application.

As shown in FIG. 1 to FIG. 9, an embodiment of this application discloses a camera apparatus and an electronic device. The disclosed camera apparatus includes a supporting circuit board 100, an outer frame base 200, an inner frame base 300, a photosensitive chip 400, a lens holder 500, a lens 600, and a first driving mechanism 700.

The supporting circuit board 100 is capable of providing power to an electrical structure in the camera apparatus and also supporting a structure disposed on the supporting circuit board. The inner frame base 300 and the outer frame base 200 play a role in supporting the photosensitive chip 400, the lens holder 500, the lens 600, and the first driving mechanism 700, and can also facilitate an electrical connection between the supporting circuit board 100 and the photosensitive chip 400.

The outer frame base 200 is disposed on the supporting circuit board 100, and the outer frame base 200 is connected to the supporting circuit board 100 via a conductive adhesive layer A. The conductive adhesive layer A contains conductive particles, enabling the conductive adhesive layer A to not only connect the outer frame base 200 and the supporting circuit board 100 but also provide electrical conductivity between the two. Certainly, the outer frame base 200 can alternatively be electrically connected to the supporting circuit board 100 in other ways. For example, the outer frame base 200 and the supporting circuit board 100 can be electrically connected via a conductive coating layer, a soldering member, or the like.

The lens holder 500 is disposed on the outer frame base 200, and the lens 600 is disposed on the lens holder 500, in other words, the lens 600, the lens holder 500, and the outer frame base 200 are disposed sequentially on the supporting circuit board 100, and the supporting circuit board 100 is electrically connected to the photosensitive chip 400 via the outer frame base 200 and the inner frame base 300 sequentially, such that the outer frame base 200 and the inner frame base 300 can transfer electrical energy from the supporting circuit board 100 to the photosensitive chip 400, thus realizing the function of the photosensitive chip 400.

The inner frame base 300 is movably disposed on the outer frame base 200, and the photosensitive chip 400 is disposed on the inner frame base 300, such that the photosensitive chip 400 and the supporting circuit board 100 are separated by the inner frame base 300 and the outer frame base 200. In this way, the inner frame base 300 can drive the photosensitive chip 400 to move relatively without the problem of being impeded by the supporting circuit board 100. The photosensitive chip 400 and the lens 600 are arranged opposite to each other, which is beneficial for the electronic device to capture high-quality pictures through the lens 600. The first driving mechanism 700 is configured to drive the inner frame base 300 to move, such that the photosensitive chip 400 is capable of performing stabilization movements along with the inner frame base 300 in a plane perpendicular to an optical axis of the lens 600. The photosensitive chip 400 is arranged in such a way that the photosensitive chip 400 is separated from the supporting circuit board 100 by the inner frame base 300 and the outer frame base 200. This enables the photosensitive chip 400 to be electrically connected to the supporting circuit board 100 without being affected by it. As a result, the photosensitive chip 400, when driven to perform stabilization movements, is not affected by the supporting circuit board 100.

The camera apparatus disclosed in the embodiments of this application is improved based on structure of the camera apparatus in the related art. With the photosensitive chip 400 disposed on the inner frame base 300, the inner frame base 300 disposed on the outer frame base 200, the outer frame base 200 disposed on the supporting circuit board 100, the lens holder 500 disposed on the outer frame base 200, the lens 600 disposed on the lens holder 500, the inner frame base 300 movably disposed on the outer frame base 200, and the photosensitive chip 400 electrically connected to the supporting circuit board 100 via the inner frame base 300 and the outer frame base 200, the lens 600, the lens holder 500, the photosensitive chip 400, the inner frame base 300, and the outer frame base 200 are disposed sequentially on the supporting circuit board 100, and the inner frame base 300 can drive, under driving of the first driving mechanism 700, the photosensitive chip 400 to move, so as to achieve stabilization movements of the camera apparatus. In this way, the photosensitive chip 400 is not impeded by the supporting circuit board 100 during stabilization movements, thus solving the problem in the background that movement of the photosensitive chip under driving is impeded by the flexible circuit board.

In the camera apparatus disclosed in the embodiments of this application, the supporting circuit board 100, the outer frame base 200, the lens holder 500, and the lens 600 can enclose a sealed space, and the inner frame base 300 and the photosensitive chip 400 are located in the sealed space. In this case, the sealed space forms a protective structure for the inner frame base 300 and the photosensitive chip 400. Such sealed space can prevent foreign objects such as water and dust from entering, thus providing good dust-proof and waterproof effects. In addition, it can also prevent other foreign objects from entering and falling on the photosensitive chip 400 to affect the shooting.

In the camera apparatus disclosed in the embodiments of this application, the camera apparatus further includes an adjustable lens module (T-lens module) 800. The adjustable lens module 800 can include a zoom area, where the zoom area is arranged opposite to the lens 600; and the adjustable lens module 800 is electrically connected to the supporting circuit board 100, such that the zoom area and the lens 600 can cooperate to achieve the zoom function of the camera apparatus. As a result, when the distance between the camera apparatus and a shooting object changes, the camera apparatus can still shoot high-quality pictures. In the embodiments of this application, the T-lens module 800 can change the thickness of the zoom area when powered on, thereby achieving the purpose of zooming. This enables the camera apparatus to achieve zooming without a zoom motor, which not only avoids the volume and cost problems caused by the configuration of the zoom motor but also reduces the weight of the entire camera apparatus. When the camera apparatus is configured in an electronic device, it is beneficial for the development of electronic devices toward lightweight and thin design.

In a further technical solution, the camera apparatus may further include a protective housing 1000, and the protective housing 1000 can protect the internal structure of the camera apparatus. The protective housing 1000 is mounted on the outer frame base 200, the protective housing 1000 is provided with an avoidance hole 1000a, the lens 600 and the lens holder 500 are located in the protective housing 1000, the adjustable lens module 800 is mounted on the protective housing 1000 and covers the avoidance hole 1000a, and the lens 600 is arranged opposite to the avoidance hole 1000a, such that when the internal structure of the camera apparatus is protected by the protective housing 1000, the lens 600 can be arranged opposite to the adjustable lens module 800 through the avoidance hole 1000a, thereby achieving the adjustable focus shooting function of the camera apparatus.

In a more specific solution, the first driving mechanism 700 may be a first electromagnetic driving mechanism, the protective housing 1000 is an electromagnetic shielding housing, and the protective housing 1000 is disposed on the first driving mechanism 700, such that the protective housing 1000 can provide both protection and shielding for the first driving mechanism 700. This can prevent electromagnetic interference from the external environment on the first driving mechanism 700, thereby enabling the first driving mechanism 700 to stably and accurately drive the inner frame base 300.

In the camera apparatus disclosed in the embodiments of this application, the photosensitive chip 400 can be soldered to the inner frame base 300 through solder balls 410 arranged in a row, and the photosensitive chip 400 is electrically connected to the inner frame base 300 through the solder balls 410, and/or the inner frame base 300 is electrically connected to the outer frame base 200 through gold wires B arranged in a row. In this case, the photosensitive chip 400 is fixedly connected to the inner frame base 300 through the solder balls 410, such that the solder balls 410 can also play a fixing role on the photosensitive chip 400 when electrically connecting the photosensitive chip 400 to the inner frame base 300. The inner frame base 300 can be electrically connected to the outer frame base 200 through the gold wires B, such that the inner frame base 300 and the outer frame base 200 can achieve relative rotation while realizing electrical connection.

In the camera apparatus disclosed in the embodiments of this application, the camera apparatus can further include a filter 900. The filter 900 is disposed on the inner frame base 300, and the filter 900 covers the photosensitive chip 400. In this case, the filter 900 can be connected to the photosensitive chip 400 via a connective adhesive layer C, such that the filter 900 can be fixed on the photosensitive chip 400. In this way, during shooting by the camera apparatus, the external environmental light can pass through the filter 900 first for filtering, such that the filter can filter out unwanted colors in the environmental light, thus preventing the unwanted colors from entering the photosensitive chip 400 to affect the shooting effect of the camera apparatus. In addition, the filter 900 is integrated on the inner frame base 300 and covers the photosensitive chip 400, which not only protects the photosensitive chip 400 but also facilitates more compact assembly and easy formation of modules, thereby realizing overall disassembly and assembly.

In the camera apparatus disclosed in the embodiments of this application, the first driving mechanism 700 may include a first driving sub-mechanism 710, the first driving sub-mechanism 710 includes a first electromagnetic coil 711 and a first permanent magnet 712, the first electromagnetic coil 711 is disposed on the outer frame base 200 and electrically connected to the outer frame base 200, the first permanent magnet 712 is disposed on the inner frame base 300, and the first driving sub-mechanism 710 drives the inner frame base 300 to move in the first direction relative to the outer frame base 200; and the first driving mechanism 700 further includes a second driving sub-mechanism 720, the second driving sub-mechanism 720 includes a second electromagnetic coil 721 and a second permanent magnet 722, the second electromagnetic coil 721 is disposed on the outer frame base 200 and electrically connected to the outer frame base 200, and the second permanent magnet 722 is disposed on the inner frame base 300, where the second driving sub-mechanism 720 drives the inner frame base 300 to move in a second direction relative to the outer frame base 200, the first direction intersects the second direction, and a surface defined by the intersection of the first direction and the second direction is the plane.

In the above situation, in a case that the first electromagnetic coil 711 electrically connected to the outer frame base 200 is energized, it generates a driving force on the first permanent magnet 712, such that the inner frame base 300 provided with the first permanent magnet 712 can move in the first direction under the driving of the first electromagnetic coil 711; similarly, in a case that the second electromagnetic coil 721 electrically connected to the outer frame base 200 is energized, it generates a driving force on the second permanent magnet 722, such that the inner frame base 300 provided with the second permanent magnet 722 can move in the second direction under the driving of the second electromagnetic coil 721. This enables the first driving mechanism 700 to drive the inner frame base 300 via the first driving sub-mechanism 710 and the second driving sub-mechanism 720 and drive the inner frame base 300 to move in the first direction and the second direction, such that the inner frame base 300 can drive the photosensitive chip 400 to move in the plane where the first direction and the second direction intersect for motion stabilization. This can achieve stabilization in multiple directions, which in turn can improve the stabilization performance of the camera apparatus.

In a further technical solution, a first set of rolling elements 1100 can be disposed between the inner frame base 300 and the outer frame base 200, and the inner frame base 300 can move in the first direction via the first set of rolling elements 1100. A second set of rolling elements 1200 can be disposed between the inner frame base 300 and the supporting circuit board 100, and the inner frame base 300 can move in the second direction via the second set of rolling elements 1200. In this case, the first set of rolling elements 1100 can assist the inner frame base 300 to move in the first direction, while the second set of rolling elements 1200 can assist the inner frame base 300 to move in the second direction, such that when the inner frame base 300 moves in the first direction and the second direction, the first set of rolling elements 1100 and the second set of rolling elements 1200 can reduce the friction between the inner frame base 300 and the outer frame base 200, making it easier for the first driving mechanism 700 to drive the inner frame base 300.

In the camera apparatus disclosed in the embodiments of this application, the camera apparatus can further include a lifting mechanism 1300, the lifting mechanism 1300 is disposed in a holding space, the inner frame base 300 is connected to the lifting mechanism 1300, and the lifting mechanism 1300 drives the inner frame base 300 to drive the photosensitive chip 400 to move along a direction of the optical axis. In this case, the photosensitive chip 400 can be driven by the inner frame base 300 to move along the direction of the optical axis under the driving of the lifting mechanism 1300, such that the photosensitive chip 400 can also achieve stabilization of the camera apparatus in the direction of the optical axis by movement.

In a more specific solution, the lifting mechanism 1300 may include a support portion 1310 and a second driving mechanism 1320, the second driving mechanism 1320 is configured to drive the support portion 1310 to move along the optical axis, the inner frame base 300 is disposed on the support portion 1310, the inner frame base 300 is capable of driving the photosensitive chip 400 to move with the support portion 1310, and the second driving mechanism 1320 is a second electromagnetic driving mechanism. In this way, the second driving mechanism 1320 can drive the support portion 1310 to move along the optical axis, and accordingly, the inner frame base 300 located on the support portion 1310 can be driven to move along the optical axis, ultimately enabling the photosensitive chip 400 to move along the direction of the optical axis. The use of an electromagnetic driving mechanism as the second driving mechanism 1320 makes the overall structure of the lifting mechanism 1300 simple and also makes the overall volume of the lifting mechanism 1300 smaller.

In a more optimized solution, a third set of rolling elements 1330 is disposed between the support portion 1310 and the outer frame base 200, the support portion 1310 is provided with a guide slot 1311, and the third set of rolling elements 1330 is disposed in the guide slot 1311 and is capable of rolling relative to the guide slot 1311. In this way, when the second driving mechanism 1320 drives the support portion 1310 to move along the direction of the optical axis, the third set of rolling elements 1330 can reduce the friction between the outer frame base 200 and the support portion 1310, which is beneficial for the second driving mechanism 1320 to drive the support portion 1310. Moreover, the setting of the guide slot 1311 allows at least a part of the third set of rolling elements 1330 to be installed in the guide slot 1311, which not only ensures the good rolling guidance effect of the third set of rolling elements 1330 but also reduces the size of the third set of rolling elements 1330 in one direction of the camera apparatus.

Based on the foregoing camera apparatus, an embodiment of this application discloses an electronic device, and the disclosed electronic device includes the camera apparatus according to any one of the above.

The electronic device disclosed in the embodiments of this application may be a smartphone, a tablet computer, an e-book reader, a wearable device (for example, a smartwatch), a game console, or other devices. A specific type of electronic device is not limited in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A camera apparatus comprising a supporting circuit board, an outer frame base, an inner frame base, a photosensitive chip, a lens holder, a lens, and a first driving mechanism, wherein
   the outer frame base is disposed on the supporting circuit board, the lens holder is disposed on the outer frame base, the lens is disposed on the lens holder, and the supporting circuit board is electrically connected to the photosensitive chip via the outer frame base and the inner frame base sequentially; and
   the inner frame base is movably disposed on the outer frame base, the photosensitive chip is disposed on the inner frame base, the photosensitive chip is arranged opposite to the lens, the first driving mechanism is configured to drive the inner frame base to move, and the photosensitive chip is capable of performing stabilization movements along with the inner frame base in a plane perpendicular to an optical axis of the lens;
   wherein the camera apparatus further comprises a lifting mechanism, the lifting mechanism is disposed in a holding space, the inner frame base is connected to the lifting mechanism, and the lifting mechanism drives the inner frame base to drive the photosensitive chip to move along a direction of the optical axis.

2. The camera apparatus according to claim 1, wherein the supporting circuit board, the outer frame base, the lens holder, and the lens enclose a sealed space, and the inner frame base and the photosensitive chip are located in the sealed space.

3. The camera apparatus according to claim 1, wherein the camera apparatus further comprises an adjustable lens module, the adjustable lens module comprises a zoom area, the zoom area is arranged opposite to the lens, and the adjustable lens module is electrically connected to the supporting circuit board.

4. The camera apparatus according to claim 3, wherein the camera apparatus further comprises a protective housing, the protective housing is mounted on the outer frame base, the protective housing is provided with an avoidance hole, and the lens and the lens holder is located within the protective housing, wherein the adjustable lens module is mounted on the protective housing and covers the avoidance hole, and the lens is arranged opposite to the avoidance hole.

5. The camera apparatus according to claim 4, wherein the first driving mechanism is a first electromagnetic driving mechanism, the protective housing is an electromagnetic shielding housing, and the protective housing is disposed on the first driving mechanism.

6. The camera apparatus according to claim 1, wherein the photosensitive chip is soldered to the inner frame base through solder balls arranged in a row, the photosensitive chip is electrically connected to the inner frame base through the solder balls, and/or the inner frame base is electrically connected to the outer frame base through gold wires arranged in a row.

7. The camera apparatus according to claim 1, wherein the camera apparatus further comprises a filter, the filter is disposed on the inner frame base, and the filter covers the photosensitive chip.

8. The camera apparatus according to claim 1, wherein the first driving mechanism comprises a first driving sub-mechanism, the first driving sub-mechanism comprises a first electromagnetic coil and a first permanent magnet, the first electromagnetic coil is disposed on the outer frame base and is electrically connected to the outer frame base, the first permanent magnet is disposed on the inner frame base, and the first driving sub-mechanism drives the inner frame base to move in a first direction relative to the outer frame base; and the first driving mechanism further comprises a second driving sub-mechanism, the second driving sub-mechanism comprises a second electromagnetic coil and a second permanent magnet, the second electromagnetic coil is disposed on the outer frame base and electrically connected to the outer frame base, and the second permanent magnet is disposed on the inner frame base; and the second driving sub-mechanism drives the inner frame base to move in a second direction relative to the outer frame base, the first direction intersects the second direction, and a surface defined by the intersection of the first direction and the second direction is the plane.

9. The camera apparatus according to claim 8, wherein a first set of rolling elements is disposed between the inner frame base and the outer frame base, the inner frame base moves in the first direction via the first set of rolling elements, a second set of rolling elements is disposed between the inner frame base and the supporting circuit board, and the inner frame base moves in the second direction via the second set of rolling elements.

10. The camera apparatus according to claim 1, wherein the lifting mechanism comprises a support portion and a second driving mechanism, the second driving mechanism is configured to drive the support portion) to move along the optical axis, the inner frame base is disposed on the support portion, the inner frame base is capable of driving the photosensitive chip to move with the support portion, and the second driving mechanism is a second electromagnetic driving mechanism.

11. The camera apparatus according to claim 10, wherein a third set of rolling elements is disposed between the support portion and the outer frame base, the support portion is disposed with a guide slot, and the third set of rolling elements is disposed in the guide slot and is capable of rolling relative to the guide slot.

12. An electronic device comprising the camera apparatus according to claim 1.

13. The electronic device according to claim 12, wherein the supporting circuit board, the outer frame base, the lens holder, and the lens enclose a sealed space, and the inner frame base and the photosensitive chip are located in the sealed space.

14. The electronic device according to claim 12, wherein the camera apparatus further comprises an adjustable lens module, the adjustable lens module comprises a zoom area, the zoom area is arranged opposite to the lens, and the adjustable lens module is electrically connected to the supporting circuit board.

15. The electronic device according to claim 14, wherein the camera apparatus further comprises a protective housing, the protective housing is mounted on the outer frame base, the protective housing is provided with an avoidance hole, and the lens and the lens holder is located within the protective housing, wherein the adjustable lens module is mounted on the protective housing and covers the avoidance hole, and the lens is arranged opposite to the avoidance hole.

16. The electronic device according to claim 15, wherein the first driving mechanism is a first electromagnetic driving mechanism, the protective housing is an electromagnetic shielding housing, and the protective housing is disposed on the first driving mechanism.

17. The electronic device according to claim 12, wherein the photosensitive chip is soldered to the inner frame base through solder balls arranged in a row, the photosensitive chip is electrically connected to the inner frame base through the solder balls, and/or the inner frame base is electrically connected to the outer frame base through gold wires arranged in a row.

18. The electronic device according to claim 12, wherein the camera apparatus further comprises a filter, the filter is disposed on the inner frame base, and the filter covers the photosensitive chip.

19. The electronic device according to claim 12, wherein the first driving mechanism comprises a first driving sub-mechanism, the first driving sub-mechanism comprises a first electromagnetic coil and a first permanent magnet, the first electromagnetic coil is disposed on the outer frame base and is electrically connected to the outer frame base, the first permanent magnet is disposed on the inner frame base, and the first driving sub-mechanism drives the inner frame base to move in a first direction relative to the outer frame base; and the first driving mechanism further comprises a second driving sub-mechanism, the second driving sub-mechanism comprises a second electromagnetic coil and a second permanent magnet, the second electromagnetic coil is disposed on the outer frame base and electrically connected to the outer frame base, and the second permanent magnet is disposed on the inner frame base; and the second driving sub-mechanism drives the inner frame base to move in a second direction relative to the outer frame base, the first direction intersects the second direction, and a surface defined by the intersection of the first direction and the second direction is the plane.

* * * * *